United States Patent Office 3,284,293
Patented Nov. 8, 1966

3,284,293
NOVEL FUNGICIDES
Günther Mohr, Konrad Niethammer, Sigmund Lust, and Gerhart Schneider, Darmstadt, Germany, assignors to E. Merck Aktiengesellschaft, Darmstadt, Germany
No Drawing. Filed Mar. 30, 1964, Ser. No. 355,929
Claims priority, application Germany, Apr. 2, 1963, M 56,343
10 Claims. (Cl. 167—33)

This invention relates to novel fungicides having a wide range of activity.

It has been found that 4-substituted 2,6-dichloro-3,5-dicyano-pyridines of the formula

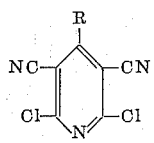

wherein

R is any one of alkyl containing 1–8 carbon atoms, phenyl, naphthyl of pyridyl groups, said aromatic compounds being optionally substituted in one or more places by $CH_3$, $C_2H_5$, $CH_3O$, $C_2H_5O$, —O—$CH_2$—O, HO, F, Cl, Br, $NO_2$, $NH_2$ or dialkylamino (alkyl up to $C_6$)

have a pronounced fungicidal action. The 2,6-dichloro-3,5-dicyano-4-phenyl-pyridine (I) is especially effective.

The fungicidal activities of these compounds are characterized especially by their wide range. Besides being very effective against those fungi which can also be fought with the usual fungicidal agents of average range, these new agents also have a definite inhibiting effect on the powdery mildew. The mildew fungi have heretofore been fought successfully only with sulfur preparations or with the specific mildew fungicide 2,4-dinitro-6-sec.octylphenyl-crotonate, although the latter is practically ineffective against other fungi.

The compounds of this invention are characterized by only slight toxicity. For example, the $LD_{50}$ of I for oral application to rats is above 5 g./kg.

The object of this invention is, therefore, to provide a fungicidal agent, characterized by the presence of one or more 4-substituted 2,6-dichloro-3,5-dicyano-pyridines of the given formula, especially of Formula I, besides the usual carriers and/or fillers.

Upon further study of the specification and claims other objects and advantages of the present invention will become apparent.

The fungicidal activity of the 4-substituted 2,6-dichloro-3,5-dicyano-pyridines is better than that of the most important organic general fungicides, as will be apparent from the following listing of tested compounds.

(a) Prior art compounds:

A  Zinc-dimethyl-dithiocarbamate
B  Tetramethyl-thiuram-disulfide
C  N-trichlormethylthio-tetrahydro-phthalimide
D  2,4-dinitro-6-sec.-octylphenyl-crotonate
E  Zinc-ethylene-bis-(dithiocarbamate)
F  N-trichlormethylthio-phthalimide (b) Compounds of this invention:

I  2,6-dichloro-3,5-dicyano-4-phenyl-pyridine
II  2,6-dichloro-3,5-dicyano-4-methyl-pyridine
III  2,6-dichloro-3,5-dicyano-4-isopropyl-pyridine
IV  2,6-dichloro-3,5-dicyano-4-(p-nitrophenyl)-pyridine
V  2,6-dichloro-3,5-dicyano-4-(m-nitrophenyl)-pyridine
VI  2,6-dichloro-3,5-dicyano-4-ethyl-pyridine
VII  2,6-dichloro-3,5-dicyano-4-propyl-pyridine

I. SPORE GERMINATION TESTS

The action *invitro* upon conidiospores of *Venturia inaequalis* (apple scab), *Alternaria spec.* (leaf spot fungus), *Cladosporium fulvum* (brown and satin spots on tomatoes), and *Botrytis cinera* (brown fungus rot) was tested by the known spore germination testing process. The results of these tests are given in the following Tables 1 to 4. The amount of the active agent is that which is necessary to prevent 50 to 95% of the spores from germinating ($DL_{50}$ to $DL_{95}$, average value from 3 tests).

TABLE 1.—SLIDES—SPORE GERMINATION TEST
[Test fungus: *Venturia inaequalis*]

| Active Agent | In mg./100 cm.² | |
|---|---|---|
| | $DL_{50}$ | $DL_{95}$ |
| I | 0.010 | 0.022 |
| II | 0.010 | 0.017 |
| III | 0.010 | 0.020 |
| IV | 0.0019 | 0.0038 |
| V | 0.0026 | 0.0065 |
| A | 0.012 | 0.041 |
| B | 0.010 | 0.025 |
| (D) | (0.49) | (0.92) |

TABLE 2.—SLIDES—SPORE GERMINATION TEST
[Test fungus: *Alternaria spec.*]

| Active Agent | In mg./100 cm.² | |
|---|---|---|
| | $DL_{50}$ | $DL_{95}$ |
| I | 0.019 | 0.075 |
| II | 0.013 | 0.027 |
| III | 0.024 | 0.046 |
| IV | 0.008 | 0.018 |
| V | 0.012 | 0.028 |
| VI | 0.036 | 0.070 |
| A | 0.036 | 0.088 |
| B | 0.025 | 0.073 |
| C | 0.033 | 0.081 |
| (D) | (<1.4) | (>1.4) |

TABLE 3.—SLIDES—SPORE GERMINATION TEST
[Test fungus: *Cladosporium fulvum*]

| Active Agent | In mg./100 cm.² | |
|---|---|---|
| | $DL_{50}$ | $DL_{95}$ |
| I | 0.002 | 0.003 |
| A | 0.009 | 0.021 |
| B | 0.005 | 0.010 |
| C | 0.009 | 0.018 |
| (D) | (1.2) | (3.0) |

TABLE 4.—SLIDES—SPORE GERMINATION TEST
[Test fungus: *Botrytis cinerea*]

| Active Agent | In mg./100 cm.² | |
|---|---|---|
| | $DL_{50}$ | $DL_{95}$ |
| I | 0.006 | 0.011 |
| A | 0.024 | 0.046 |
| B | 0.014 | 0.020 |
| C | 0.020 | 0.035 |
| (D) | (>7.0) | (>7.0) |

II. ACCELERATED SIMULATED FIELD TESTS FOR ORIENTATION

The excellent fungicidal action in vitro of compound I was confirmed in some experiments on hosts infected with important pathogenic fungi and was compared with known fungicidal agents.

(1) Prevention of infection with *Plasmopara viticola* in vine leaves.

*Method.*—The active agents were suspended in water with the help of 1 part by weight of polyoxy-ethylene-sorbitan-mono-oleate. Isolated vine leaves of the "silvaner" variety were sprayed on their under sides with this suspension. After the suspension had dried, 10 drops of a spore suspension of the tested fungus were deposited on the intercoastal areas of the leaf surface. After 24 hours the drops were removed by suction. The leaves were then stored in a damp chamber at room temperature under illumination until used.

Each recorded value is an average of three separate tests and represents the percentage of inoculated places where infection was prevented by the sprayed coating.

TABLE 5

[Test fungus: *Plasmopara viticola* (average of three tests)]

| Active substance | Concentrations of active agent in suspension | | | |
|---|---|---|---|---|
| | 0.02% | 0.05% | 0.1% | 0.2% |
| | percent infection prevention | | | |
| I | 27 | 74 | 100 | 100 |
| C | 20 | 40 | 77 | 95 |
| (D) | (O) | (O) | (x) | (x) |

(x) Denotes phytotoxic, the attack being impossible to judge perfectly (2) Spraying of tomatoes against infection by *Phytophthora infestans*.

*Method.*—Tomato plants ("Lukullus") are sprayed in their "3-sequence leaf stage" with polyoxyethylene-sorbitan-mono-oleate in a 1:1 water suspension. After the suspension has dried the leaves are sprayed with a zoospore suspension of *Phytophthora infestans* and allowed to stand 24 hours at 12 to 15° C. in a 100% moisture saturated atmosphere.

The table gives the infection results in percent infected.

TABLE 6

[Test fungus: *Phytophthora infestans*]

| Active agent | Concentrations of active agent in suspension | | | |
|---|---|---|---|---|
| | 0.05% | 0.02% | 0.01% | 0.005% |
| | Percent infected, control=100 | | | |
| I | 25 | 23 | 47 | 56 |
| B | 85 | 100 | 100 | 100 |
| C | 57 | 100 | 100 | 100 |

(3) Spraying of wheat plants against *Erysiphe graminis forma specialis tritici*.

*Method.*—Wheat seed-plants were infected with conidia of erysiphe and were kept in a greenhouse at 20 to 25° C. 2, 4, and 6 days after the infection some of the experimental plants were sprayed with a suspension of the active agent in water (polyethylene-sorbitan-mono-oleate, 1:1). They were evaluated 10 and 14 days after infection. Infection of the leaves and of the coleoptiles was recorded separately.

TABLE 7

[Test fungus: *Erysiphe graminis f. sp. tritici*]

| Active agent | Sprayed, days after infection | Percent infection reduction in concentration range (0.2-0.02%) | | |
|---|---|---|---|---|
| | | Leaf after 10 days | 14 days | Coleoptiles after 14 days |
| I | 2 | 67 | 17 | 100 |
| | 4 | 83 | 25 | 42 |
| | 6 | 63 | 33 | |
| D | 2 | 92 | 62 | 100 |
| | 4 | 100 | 92 | 100 |
| | 6 | 92 | 75 | |
| B | 2 | 42 | 0 | 17 |
| | 4 | 25 | 8 | 0 |
| | 6 | | | |
| C | 2 | 8 | 0 | 33 |
| | 4 | 25 | 0 | 0 |
| | 6 | | | |

III. OPEN GROUND EXPERIMENTS

Spraying of vines against infection by *peronospora*.

Areas of 5 m.² each, covered with vines of the "Riesling," "Silvaner" and "Muller-Thurgau" varieties were sprayed 9 times in 9 weeks with suspensions of the active agents. One week after the last spraying the leaves were evaluated. Those which had more than three infected places were considered as being infected, and their percentage of the total number of leaves was recorded.

TABLE 8

| Kind of vine | Active agent | Concentration, percent | Infected, percent |
|---|---|---|---|
| Riesling | I | 0.05 | 44.5 |
| | | 0.1 | 26.9 |
| | | 0.2 | 8.2 |
| | E | 0.2 | 45.5 |
| | F | 0.15 | 43.3 |
| | Untreated | | 100.0 |
| Silvaner | I | 0.05 | 63.8 |
| | | 0.1 | 55.0 |
| | | 0.2 | 41.7 |
| | E | 0.2 | 62.5 |
| | F | 0.15 | 60.2 |
| | Untreated | | 100.0 |
| Muller-Thurgau | I | 0.05 | 47.3 |
| | | 0.1 | 45.8 |
| | | 0.2 | 24.7 |
| | E | 0.2 | 53.4 |
| | F | 0.15 | 52.7 |
| | Untreated | | 100.0 |

The results show that agent I of this invention is more effective than agents E and F with which it was compared.

IV. PLANT TOLERANCE (1) Drop-application test on the primary leaves of beans.

*Method.*—The upper sides of the primary leaves of almost completely developed bush beans (potted "Saxa" plants) were wetted with an aqueous suspension of the fungicidal agent (2 drops per leaf). The agent was used with polyoxyethylene sorbitan-mono-oleate 1:1. Then the leaf was punctured from below into the drop with a needle.

TABLE 9.—PHYTOTOXICITY OF FUNGICIDAL AGENTS TOWARD LEAF TISSUES OF BEAN PLANTS

Formation of dark zones around the punctured places one week after treatment; diameter in mm. (average of four places) for various concentrations.

| Active agent | Concentration of active ingredients, percent | | | | |
|---|---|---|---|---|---|
| | 5.0 | 2.0 | 1.0 | 0.5 | 0.2 |
| I | 0 | 0 | 0 | 0 | 0 |
| B | 1.0 | 0.75 | 0.5 | | |
| C | 1.5 | 1.0 | 0.5 | | |
| D | 7.5 | 4.5 | 3.25 | 2.75 | 2.0 |
| Control (water drop) | 0 | 0 | 0 | 0 | 0 |

(2) Plant spraying.

Young plants of oats, wheat, pumpkin, bush beans and tomatoes, as well as vine cuttings and apples were sprayed with an aqueous polyoxyethylene-sorbitan-monooleate suspension of the fungicidal agent (1:1) until they were dripping wet. The tolerance for I was generally very good, even in the highest concentration of 0.4 to 0.5%, especially in comparison with agent D.

In addition to their wide range of applicability and their effectiveness for preventing mildew infection, the new compounds are also characterized by good plant compatibility.

The 4-substituted 2,6-dichloro-3,5-dicyano-pyridines can be produced from the corresponding 4-substituted 3,5-dicyano-6-hydroxy-2-pyridones by reaction with a chlorinating agent without or with the addition of a solvent. As a starting material, consideration can be given e.g. to 4-phenyl-, 4-o-, 4-m- or 4-p-tolyl, 4-o-, 4-m- or 4-p-methoxyphenyl-, 4-o-, 4-m- or 4-p-hydroxyphenyl-, 4-α-naphthyl-, 4-β-naphthyl-, 4-o-, 4-m- or 4-p-halogenphenyl-, 4-o-, 4-m- or 4-p-nitro-phenyl-, 4-o-, 4-m- or 4-p-amino- or -dialkylaminophenyl-3,5-dicyano-6-hydroxy-2-pyridone. Suitable chlorinating agents are e.g. phosphorus pentachloride, phosphorus oxychloride, phosphorus trichloride, thionyl chloride, sulfuryl chloride or mixtures thereof with or without the addition of solvents. Suitable solvents are inert organic liquids such as benzene, chlorinated benzene, dimethyl-formamide, tertiary bases such as pyridine, quinoline, triethylamine, tributylamine, dimethylaniline or mixtures of those alone or with other inert solvents.

The reaction will occur at room temperature, but it is advantageous to warm or boil the mixture for a while. The reaction is generally completed after 0.5 to 10 hours, depending on the conditions.

2,6-dichloro-3,5-dicyano-4-methyl-pyridine and the corresponding 4-ethyl-compound are known (collection of Czechoslovak chemical communications, 25, 2173 (1960)), but not their prominent fungicidal activity.

The 4-aryl-3,5-dicyano-6-hydroxy-2-pyridones are in part known (see Jour. Chem. Soc., vol. 117 (1920), p. 1473). They can be produced by condensation of 2 molecules cyanacetamide with suitable aromatic aldehydes in the presence of a basic condensation agent. The cyanacetamide can be prepared from cyanoacetic ester and ammonia, or can be produced in situ from chloroacetic ester, potassium or sodium cyanide and ammonia. Suitable condensation agents are e.g. ammonia, sodium or potassium hydroxide or sodium or potassium alcoholates. Suitable aldehydes are acetaldehyde, propionaldehyde, butyraldehyde, isobutyraldehyde, 3-methylbutanealdehyde, benzaldehyde, o-, m- and p-tolylaldehyde, o-, m- and p-methoxybenzaldehyde, o-, m- and p-hydroxybenzaldehyde, o-, m- and p-chlorobenzaldehyde, o-, m- and p-bromobenzaldehyde, o-, m- and p-nitrobenzaldehyde, o-, m- and p-amino- or -dialkylaminobenzaldehyde wherein alkyl $<C_6$, 1-naphthaldehyde, 2-naphthaldehyde and 2-, 3- and 4-pyridine-aldehyde.

Particularly suitable fungicidal agents according to this invention are 2,6-dichloro-3,5-dicyano-4-methyl-,
-4-ethyl-,
-4-propyl-,
-4-isopropyl-,
-4-butyl-,
-4-isobutyl-,
-4-amyl-,
-4-isoamyl-,
-4-hexyl-,
-4-heptyl-,
-4-octyl-,
-4-phenyl-,
-4-o-tolyl-,
-4-m-tolyl,
-4-p-tolyl-,
-4-(o-ethylphenyl)-,
-4-(m-ethylphenyl)-,
-4-(p-ethylphenyl)-,
-4-(o-methoxyphenyl)-,
-4-(m-methoxyphenyl)-,
-4-(p-methoxyphenyl)-,
-4-(3,4-dimethoxyphenyl)-,
-4-(p-ethoxyphenyl)-,
-4-(3,4-methylendioxyphenyl)-,
-4-(o-hydroxyphenyl)-,
-4-(m-hydroxyphenyl)-,
-4-(p-hydroxyphenyl)-,
-4-(2,4-dihydroxyphenyl)-,
-4-(o-fluorophenyl)-,
-4-(m-fluorophenyl)-,
-4-(p-fluorophenyl)-,
-4-(o-chlorophenyl)-,
-4-(m-chlorophenyl)-,
-4-(p-chlorophenyl)-,
-4-(2,4-dichlorophenyl)-,
-4-(o-bromophenyl)-,
-4-(m-bromophenyl)-,
-4-(p-bromophenyl)-,
-4-(2,4-dibromophenyl)-,
-4-(o-nitrophenyl)-,
-4-(m-nitrophenyl)-,
-4-(p-nitrophenyl)-,
-4-(o-aminophenyl)-,
-4-(m-aminophenyl)-,
-4-(p-aminophenyl)-,
-4-(o-dimethylaminophenyl)-,
-4-(m-dimethylaminophenyl)-,
-4-(p-dimethylaminophenyl)-,
-4-(p-diethylaminophenyl)-,
-4-(p-di-n-hexylaminophenyl)-,
-4-(1-naphthyl)-,
-4-(2-naphthyl)-,
-4-(2-pyridyl)-,
-4-(3-pyridyl)- and
-4-(4-pyridyl)-pyridine The fungicidal compounds of this invention can be incorporated in the forms generally used. By the addition of the usual carrier and/or filler substances it is possible to produce spraying or dusting materials which can be mixed with other substances such as dispersing or wetting agents. It is also possible to prepare solutions or emulsions therefrom which can be applied e.g. by atomization after the addition of suitable agents. Suitable solvents for this purpose are especially certain hydrocarbons such as gasoline, petroleum, benzene, toluene, xylene, tetralin, decalin, or mixtures thereof. It is also possible to use the fungicidal agents of this invention in mixtures with other fungicidal agents. The preparations generally contain from 1 to 95% of the active agent.

Other fungicidal agents to be used in mixtures with the compounds of this invention are for instance:

N-trichloromethylthio-tetrahydro-phthalimide
2.3-dicyano-1.4-dithia-anthraquinone
n-dodecylguanidine acetate
dipyrrolidyl-thiuram-disulfide
triphenyltin-acetate
ferric N.N-dimethyl-dithio-carbamate
2.4-dinitro-6-sec.octylphenyl-crotonate
manganese-ethylene-bis-dithio-carbamate
pentachloro-nitrobenzene
2.3.5.6-tetrachloro-nitrobenzene
tetramethyl-thiuram-disulfide
zinc-ethylene-bis-(dithiocarbamate)
zinc-N.N-dimethyl-dithiocarbamate
2-heptadecyl-2-imidazoline acetate
griseofulvin
N-trichloromethylthio-phthalimide furthermore salts and organometallic compounds of mercury, copper, and arsenic such as phenylmercuric acetate or basic cupric chloride as well as the usual sulfur fungicides such as barium sulfide.

The preparations may generally contain 1 to 95% of the known fungicide in addition to the fungicide according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

23.7 g. dry 3,5-dicyano-6-hydroxy-4-phenyl-2-pyridone (produced according to Journal of the Chemical Society (London) vol. 117, (1920), p. 1473) or 25.5 g. of its ammonium salt in 150 ml. chlorobenzene are reacted with 41.7 g. phosphorus pentachloride and boiled two hours. The dark red reaction mixture is poured over ice, the organic phase separated, washed to neutrality with sodium bicarbonate solution, dried over sodium sulfate and concentrated. The yield is 12.0 g. (44% of the theoretical) 2,6-dichloro-3,5-dicyano-4-phenylpyridine (I) melting at 192–196° C. After recrystallization from benzene or ethanol, colorless crystals melting at 203–204° C. are obtained.

*Example 2*

20 g. 3,5-dicyano-6-hydroxy-4-phenyl-2-pyridone or 21.5 g. of its ammonium salt and 6 ml. pyridine in 150 ml. dry benzene are heated over night under reflux with 20 ml. phosphorus oxychloride and are then poured into 200 ml. benzene and 300 ml. ice water. The benzene phase is washed with water and sodium bicarbonate solution, dried over sodium sulfate, and evaporated to dryness. The yield is 14.5 g. (63% theoretical) of I. M.P. 202–204° C.

*Example 3*

20 g. 3,5-dicyano-6-hydroxy-4-p-tolyl-pyridone (produced according to 1 c.) or 21.5 g. of its ammonium salt are mixed with 80 g. phosphorus pentachloride and heated one hour to 130–140° C. After cooling, the mixture is poured into ice water and the precipitate recrystallized several times from ethanol or benzene. The 2,6-dichloro-3,5-dicyano-4-p-tolyl-pyridine thus obtained melts at 240–242° C. Yield 90%.

By analogy the following compounds can be obtained:

2,6-dichloro-3,5-dicyano-4-p-chlorophenyl-pyridine, F. 282–284°
2,6-dichloro-3,5-dicyano-4-(m-nitrophenyl)-pyridine, F. 214–216°
2,6-dichloro-3,5-dicyano-4-(p-nitrophenyl)-pyridine, F. 206–207°
2,6-dichloro-3,5-dicyano-4-(3-pyridyl)-pyridine, F. 183–185°
2,6-dichloro-3,5-dicyano-4-(4-pyridyl)-pyridine, F. 196–198°
2,6-dichloro-3,5-dicyano-4-propyl-pyridine, F. 104–106°
2,6-dichloro-3,5-dicyano-4-isopropyl-pyridine, F. 120–122°
2,6-dichloro-3,5-dicyano-4-isobutyl-pyridine, F. 136–137°

*Example 4*

By analogy to Example 3, from the corresponding 4-substituted 3,5-dicyano-6-hydroxy-2-pyridones or their ammonium salts, the following compounds can be obtained:

2,6-dichloro-3,5-dicyano-4-butyl-pyridine
2,6-dichloro-3,5-dicyano-4-amyl-pyridine
2,6-dichloro-3,5-dicyano-4-isoamyl-pyridine
2,6-dichloro-3,5-dicyano-4-hexyl-pyridine
2,6-dichloro-3,5-dicyano-4-heptyl-pyridine
2,6-dichloro-3,5-dicyano-4-octyl-pyridine
2,6-dichloro-3,5-dicyano-4-(o-tolyl)-pyridine
2,6-dichloro-3,5-dicyano-4-(m-tolyl)-pyridine
2,6-dichloro-3,5-dicyano-4-(o-ethylphenyl)-pyridine
2,6-dichloro-3,5-dicyano-4-(p-ethylphenyl)-pyridine
2,6-dichloro-3,5-dicyano-4-(o-methoxyphenyl)-pyridine
2,6-dichloro-3,5-dicyano-4-(m-methoxyphenyl)-pyridine
2,6-dichloro-3,5-dicyano-4-(p-methoxyphenyl)-pyridine
2,6-dichloro-3,5-dicyano-4-(3,4-dimethoxyphenyl)-pyridine
2,6-dichloro-3,5-dicyano-4-(p-ethoxyphenyl)-pyridine
2,6-dichloro-3,5-dicyano-4-(3,4-methylendioxyphenyl)-pyridine
2,6-dichloro-3,5-dicyano-4-(o-hydroxyphenyl)-pyridine
2,6-dichloro-3,5-dicyano-4-(m-hydroxyphenyl)-pyridine
2,6-dichloro-3,5-dicyano-4-(p-hydroxyphenyl)-pyridine
2,6-dichloro-3,5-dicyano-4-(2,4-dihydroxyphenyl)-pyridine
2,6-dichloro-3,5-dicyano-4-(4-hydroxy-3-methoxyphenyl)-pyridine
2,6-dichloro-3,5-dicyano-4-(o-fluorophenyl)-pyridine
2,6-dichloro-3,5-dicyano-4-(m-fluorophenyl)-pyridine
2,6-dichloro-3,5-dicyano-4-(p-fluorophenyl)-pyridine
2,6-dichloro-3,5-dicyano-4-(o-chlorophenyl)-pyridine
2,6-dichloro-3,5-dicyano-4-(m-chlorophenyl)-pyridine
2,6-dichloro-3,5-dicyano-4-(2,4-dichlorophenyl)-pyridine
2,6-dichloro-3,5-dicyano-4-(o-bromophenyl)-pyridine
2,6-dichloro-3,5-dicyano-4-(m-bromophenyl)-pyridine
2,6-dichloro-3,5-dicyano-4-(p-bromophenyl)-pyridine
2,6-dichloro-3,5-dicyano-4-(2,4-dibromophenyl)-pyridine
2,6-dichloro-3,5-dicyano-4-(o-nitrophenyl)-pyridine
2,6-dichloro-3,5-dicyano-4-(o-aminophenyl)-pyridine
2,6-dichloro-3,5-dicyano-4-(m-aminophenyl)-pyridine
2,6-dichloro-3,5-dicyano-4-(p-aminophenyl)-pyridine
2,6-dichloro-3,5-dicyano-4-(o-dimethylaminophenyl)-pyridine
2,6-dichloro-3,5-dicyano-4-(m-dimethylaminophenyl)-pyridine
2,6-dichloro-3,5-dicyano-4-(p-dimethylaminophenyl)-pyridine
2,6-dichloro-3,5-dicyano-4-(p-diethylaminophenyl)-pyridine
2,6-dichloro-3,5-dicyano-4-(p-di-n-hexylaminophenyl)-pyridine
2,6-dichloro-3,5-dicyano-4-(1-naphthyl)-pyridine
2,6-dichloro-3,5-dicyano-4-(2-naphthyl)-pyridine
2,6-dichloro-3,5-dicyano-4-(2-pyridyl)-pyridine The following examples are preparations suitable for fungicidal purposes. Instead of the specific active agent that is named, the other active agents of this invention can be used.

*Example 5*

A wettable powder—

| | Percent |
|---|---|
| 2,6-dichloro-3,5-dicyano-4-phenyl-pyridine | 50 |
| Sulfite liquor powder | 10 |
| Sodium-isobutyl-naphthaline-sulfonate (technical) | 1 |
| Bolus or chalk | 39 | are ground intimately together. The resulting powder can be sprayed or atomized as a dilute aqueous suspension.

*Example 6*

A wettable powder—

| | Percent |
|---|---|
| 2,6-dichloro-3,5-dicyano-4-methyl-pyridine | 80 |
| Oleic-acid-N-methyl-tauride | 5 |
| Fuller's earth | 15 | are ground to the necessary fineness. By dilution with water a finely divided emulsion is obtained which is suitable for spraying or atomizing.

Example 7

A dusting material—

| | Percent |
|---|---|
| 2,6-dichloro-3,5-dicyano-4-(p-nitrophenyl)-pyridine | 2 |
| Talcum | 98 | are intimately ground and applied with a suitable duster.

Example 8

A spraying solution—

A solution of 3% 2,6-dichloro-3,5-dicyano-4-(3-pyridyl)-pyridine in chloroform is atomized in the usual manner through a nozzle.

Example 9

An emulsion concentrate—

| | Percent |
|---|---|
| 2,6-dichloro-3,5-dicyano-4-octyl-pyridine | 10 |
| Dimethyl-formamide | 45 |
| Xylene | 10 |
| Fatty acid-polyglycol-ester | 30 | are mixed. The resulting solution is emulsified in water and is sprayed or atomized.

Example 10

A wettable or dust powder—

| | Percent |
|---|---|
| 2,6-dichloro-3,5-dicyano-4-ethyl-pyridine | 30 |
| 2,4-dinitro-6-sec. octylphenyl crotonate | 10 |
| Kieselguhr | 20 |
| Kaolin | 30 |
| Sodium salt of the condensation product from oleic acid and methyltaurine (technical grade 32%) | 10 | are ground to the required fineness. The powder thus obtained can be sprayed in the form of dilute aqueous suspensions or applied with a suitable duster.

Example 11

A wettable powder—

| | Percent |
|---|---|
| N-trichloromethylthio-tetrahydrophthalimide | 20 |
| 2,6-dichloro-3,5-dicyano-4-phenyl-pyridine | 30 |
| Bentonite | 40 |
| Sulfite liquor powder | 7 |
| Sodium salt of the condensation product from oleic acid and methyltaurine (technical grade 32%) | 3 | are ground intimately. The resulting powder can be sprayed or atomized as dilute aqueous suspension.

Example 12

A wettable powder—

| | Percent |
|---|---|
| Zinc-ethylene-bis-(dithiocarbamate) | 40 |
| 2,6-dichloro-3,5-dicyano-4-phenyl-pyridine | 10 |
| Bolus | 40 |
| Sulfite liquor powder | 8 |
| Isobutyl naphthalene sulfonates | 2 | are ground intimately. The resulting powder can be sprayed or atomized as a dilute aqueous suspension.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A fungicidal dusting composition comprising:
 (A) as an essential fungicide, a fungicidally effective concentration of at least one compound of the formula

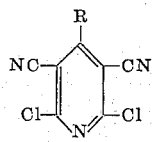

wherein R is selected from the group consisting of alkyl of
 1–8 carbon atoms,
 phenyl, naphthyl, pyridyl,
 substituted phenyl where the substituted moiety is at least one member of the group consisting of
 $CH_3$, $C_2H_5$, $CH_3O$, $C_2H_5O$, $-O-CH_2-O-$, HO, F, Cl, Br, $NO_2$, $NH_2$ and dialkyl amino containing 1–6 carbon atoms per alkyl group, and
 (B) an inert pulverulent solid diluent.
2. The composition of claim 1, wherein said compound is 2,6-dichloro-3,5-dicyano-4-phenyl-pyridine.
3. The composition of claim 1, wherein said compound is selected from the group consisting of
2,6-dichloro-3,5-dicyano-4-phenyl-pyridine,
2,6-dichloro-3,5-dicyano-4-p-tolyl-pyridine,
2,6-dichloro-3,5-dicyano-4-(p-chlorophenyl)-pyridine,
2,6-dichloro-3,5-dicyano-4-(m-nitrophenyl)-pyridine,
2,6dichloro-3,5-dicyano-4-(p-nitrophenyl)-pyridine,
2,6-dichloro-3,5-dicyano-4-propyl-pyridine,
2,6-dichloro-3,5-dicyano-4-isopropyl-pyridine,
2,6-dichloro-3,5-dicyano-4-isobutyl-pyridine,
2,6-dichloro-3,5-dicyano-4-(3-pyridyl)-pyridine, and
2,6-dichloro3,5-dicyano-4-(4-pyridyl)-pyridine 4. A fungicidal wettable powder composition comprising:
 (A) as an essential fungicide, a fungicidally effective concentration of at least one compound of the formula

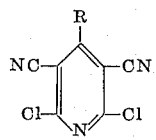

wherein R is selected from the group consisting of alkyl of
 1–8 carbon atoms,
 phenyl, naphthyl, pyridyl,
 substituted phenyl where the substituted moiety is at least one member of the group consisting of
 $CH_3$, $C_2H_5$, $CH_3O$, $C_2H_5O$, $-O-CH_2-O-$, HO, F, Cl, Br, $NO_2$, $NH_2$ and dialkyl amino containing 1–6 carbon atoms per alkyl group,
 (B) an inert pulverulent solid diluent, and
 (C) a member selected from the group consisting of a surface active agent, a solvent, and a mixture thereof.
5. The composition of claim 4, wherein said compound is selected from the group consisting of 2,6-dichloro-3,5-dicyano,4-phenyl-pyridine,
2,6-dichloro-3,5-dicyano-4-p-tolyl-pyridine,
2,6-dichloro-3,5-dicyano-4-(p-chlorophenyl)-pyridine,
2,6-dichloro-3,5-dicyano-4-(m-nitrophenyl)-pyridine,
2,6-dichloro-3,5-dicyano-4-(p-nitrophenyl)-pyradine,
2,6-dichloro-3,5-dicyano-4-propyl-pyridine,
2,6-dichloro-3,5-dicyano-4-isopropyl-pyridine,
2,6-dichloro-3,5-dicyano-4-isobutyl-pyridine,
2,6-dichloro-3,5-dicyano-4-(3-pyridyl)-pyridine, and
2,6-dichloro-3,5-dicyano-4-(4-pyridyl)-pyridine.

6. The composition of claim 4, wherein said compound is 2,6-dichloro-3,5-dicyano-4-phenyl-pyridine.

7. A process for obtaining a definite inhibiting effect on powdery mildew and other fungi and for preventing fungus spores from germinating, which comprises the step of contacting said fungi with a fungicide composition containing as an essential fungicide a fungicidally effective quantity of at least one compound of the formula

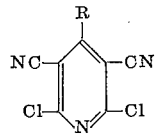

wherein R is selected from the group consisting of alkyl of
1–8 carbon atoms,
phenyl, naphthyl, pyridyl,
substituted phenyl where the substituted moiety is at least one member of the group consisting of
$CH_3$, $C_2H_5$, $CH_3O$, $C_2H_5O$, —O—$CH_2$—O—, HO, F, Cl, Br, $NO_2$, $NH_2$ and dialkyl amino containing 1–6 carbon atoms per alkyl group.

8. A process as defined by claim 7, wherein said alkyl is of 3–8 carbon atoms.

9. A process as defined by claim 7, wherein said compound is selected from the group consisting of 2,6-dichloro-3,5-dicyano,4-phenyl-pyridine,
2,6-dichloro-3,5-dicyano-4-p-tolyl-pyridine,
2,6-dichloro-3,5-dicyano-4-(p-chlorophenyl)-pyridine,
2,6-dichloro-3,5-dicyano-4-(m-nitrophenyl)-pyridine,
2,6-dichloro-3,5-dicyano-4-(p-nitrophenyl)-pyradine,
2,6-dichloro-3,5-dicyano-4-propyl-pyridine,
2,6-dichloro-3,5-dicyano-4-isopropyl-pyridine,
2,6-dichloro-3,5-dicyano-4-isobutyl-pyridine,
2,6-dichloro-3,5-dicyano-4-(3-pyridyl)-pyridine, and
2,6-dichloro-3,5-dicyano-4-(4-pyridyl)-pyridine.

10. A process as defined by claim 7, wherein said compound is 2,6-dichloro-3,5-dicyano-4-phenyl-pyridine.

References Cited by the Examiner

UNITED STATES PATENTS

| | | | |
|---|---|---|---|
| 2,282,907 | 5/1941 | Horst | 167—33 |
| 2,449,274 | 9/1948 | Broll | 167—33 |
| 2,658,850 | 11/1953 | Cislak | 167—33 |
| 2,790,805 | 4/1957 | Little et al. | 260—294.9 |
| 2,794,803 | 6/1957 | Middleton | 260—294.5 |
| 2,914,534 | 11/1959 | Middleton | 260—294.9 |
| 2,958,624 | 11/1960 | Bimber | 167—33 |
| 2,991,285 | 7/1961 | Feely | 260—283 |
| 3,046,278 | 7/1962 | Feely | 260—283 |
| 3,094,533 | 6/1963 | Hughes | 260—294.9 |
| 3,108,112 | 10/1963 | Matsui et al. | 260—294.9 |

FOREIGN PATENTS 47,892   1/1964   Poland.

OTHER REFERENCES

Chem. Abstracts 61: p. 4323de Aug. 17, 1964.
Chem. Abstracts 55: 1605h Jan. 23, 1961.

ELBERT ROBERTS, *Acting Primary Examiner.*

WALTER A. MODANCE, *Examiner.*

A. L. ROTMAN, S. ROSE, *Assistant Examiners.*